United States Patent [19]
Lowery

[11] 3,990,554
[45] Nov. 9, 1976

[54] NORMALLY ENGAGED SPRING CLUTCH ASSEMBLY DRIVABLE THROUGH EITHER CLUTCH DRUM

[75] Inventor: Robert D. Lowery, Willowick, Ohio

[73] Assignee: Marquette Metal Products Company, Cleveland, Ohio

[22] Filed: July 2, 1975

[21] Appl. No.: 592,593

[52] U.S. Cl. .............................. 192/26; 192/33 C
[51] Int. Cl.² .................... F16D 13/08; F16D 11/06
[58] Field of Search ............ 192/22, 26, 33 C, 81 R, 192/81 C, 12 BA

[56] References Cited
UNITED STATES PATENTS

| | | | |
|---|---|---|---|
| 3,062,345 | 11/1962 | Cruzen.................................. | 192/26 |
| 3,451,512 | 6/1969 | Sacchini et al. ................... | 192/26 X |
| 3,726,372 | 4/1973 | Baer et al. ......................... | 192/26 X |
| 3,844,390 | 10/1974 | Lowery............................. | 192/26 X |
| 3,920,106 | 11/1975 | Nisenson........................... | 192/26 X |

*Primary Examiner*—Benjamin W. Wyche
*Attorney, Agent, or Firm*—Arthur Frederick; Victor D. Behn

[57] ABSTRACT

The normally engaged spring clutch assembly has a helical spring in interference fit with driving and driven clutch drums to transmit rotation from one clutch drum to the other. A control sleeve surrounds and is in close spaced relation to the spring. Each of the opposite end portions of the spring are engageable with the sleeve so that, in the engaged condition of operation, the sleeve rotates with the spring and, in the disengaged condition of operation when rotation of the control sleeve is arrested, the spring is caused to release its grip on a clutch drum. The disengagement of the spring clutch assembly is achieved whichever clutch drum is the driving clutch drum.

In another embodiment, the spring is so formed that, upon disengagement by arresting rotation of the control sleeve, a portion of the spring engages the control sleeve to stop the overrun of the driven clutch drum.

10 Claims, 6 Drawing Figures

3,990,554

NORMALLY ENGAGED SPRING CLUTCH ASSEMBLY DRIVABLE THROUGH EITHER CLUTCH DRUM

DISCLOSURE OF INVENTION

The invention relates to spring clutches and, more specifically, to a spring clutch assembly of the normally engaged type which is capable of being driven through either of the two clutch drums.

BACKGROUND OF THE INVENTION

Heretofore, spring clutch assemblies of the type having a spring normally engaging two clutch drums so as to transmit torque from one clutch drum to the other and a control sleeve for controlling engagement and disengagement of the spring, could only effect disengagement by arresting rotation of the control sleeve when the drive was only through one particular clutch drum. Such known spring clutch assemblies are exemplified in the U.S. patents to Sacchini, et al, U.S. Pat. No 2,968,380; Tomko, U.S. Pat. No. 3,128,863; Sacchini, U.S. Pat. No. 3,319,751; Baer, U.S. Pat. No. 3,373,851; and Hoff, U.S. Pat. No. 3,493,088. Also, to effect braking of the driven clutch drum and connected output member, the heretofore known spring clutch assemblies had to employ a separate braking spring as is exemplified in the U.S. patents to Sacchini, et al, U.S. Pat. No. 3,451,512 and Weatherby, U.S. Pat. No. 3,521,730, or provide a lug and slot interconnection between the driven drum and the control sleeve as exemplified in the U.S. patent to Lowery, U.S. Pat. No. 3,844,390. In addition, in heretofore clutch assemblies, the stop position of the driven drum relative to the driving drum was either factory fixed or required additional parts to provide for field adjustment of the stop position, as for example, the three-piece construction of the driven drum of the spring clutch assembly disclosed in the U.S. patent to Baer, U.S. Pat. No. 3,373,851.

It is therefore an object of the present invention to provide a spring clutch assembly of the normally engaged, control sleeve type which is relatively simple in construction and yet capable of being driven through either of the clutch drums.

It is another object of this invention to provide a spring clutch assembly having a single spring which is capable of arresting rotation of the driven clutch drum in a desired position.

It is a further object of the present invention to provide a spring clutch assembly, having a normally engaged spring and a control sleeve for controlling actuation of the spring, which is capable of being driven through either clutch drums as well as capable of disengagement by arresting rotation of the control sleeve and, upon disengagement, stopping rotation of the driven drum, in a predetermined angular position.

It is a feature of this invention that the spring clutch assembly has a single helical spring that is engageable at opposite ends with the control sleeve and that the spring also serves to brake or stop the driven clutch drum in a predetermined angular position when, upon disengagement of the spring, it coasts under dynamic inertia.

SUMMARY OF THE INVENTION

Now, therefore, the present invention contemplates a novel spring clutch assembly of the normally engaged type which comprises two clutch members or drums suitably supported for rotation in axially spaced relationship to each other and a helical spring disposed coaxially to and in interference fit with the two clutch drums so as to effect transmission of torque from one clutch drum to the other. A control collar or sleeve is coaxially disposed relative to the helical spring with each of the opposite end portions of the spring disposed in an opening in the control sleeve, which openings are of a size substantially larger than the spring end portions. A control means is provided for effecting disengagement of the spring and a clutch drum and thereby interrupt transmission of torque between the clutch drums. The control means may include a movable member which is actuatable to positions into and out of the path of travel of a stop member carried by the control sleeve. When the rotation of the control sleeve is arrested by the movable member engaging the stop member, one end portion of the spring engages the end of the associated opening in the control sleeve, and thereby causes the coils of the spring to change size and move out of interference engagement with at least one of the clutch drums. The disengagement of the spring from at least one of the clutch drums interrupts the transmission of torque from one clutch drum to the other until the control means releases the control sleeve for rotation.

In another embodiment of the invention, the helical spring is provided with a coil section of different diameter coils which are in tighter interference fit with the driven clutch drum than the remaining spring coils are with the adjacent driving clutch drum. In the operation of this spring clutch assembly, the arrest of rotation of the control sleeve, and the consequent engagement of the end portion of the spring and the wall of the associated opening in the control sleeve, causes the coils to disengage from the driving clutch drum. The inertia of the driven clutch drum and output member connected thereto causes the opposite spring end portion to be carried into engagement with the wall of its associated opening in the control sleeve and thereby stops rotation of the driven clutch drum. The amount of overrun of the driven clutch drum is determined by the angular distance between the spring end portion adjacent the driven clutch drum and the wall of the associated opening in the control sleeve. In this embodiment, with the driving and driven clutch drums functionally interchanged, no braking function occurs.

In a third embodiment of this invention, the helical spring is so formed that braking of the driven clutch drum is achieved regardless of which clutch drum is the driving clutch drum. This result is achieved by providing a helical spring having two coil sections at opposite ends of the spring of different coil diameter than the diameter of the remaining middle coil section. In operation, the overrun of the driven clutch drum, upon disengagement, is stopped by action of the associated end portion of the spring engaging the wall of its associated opening in the control sleeve.

To adjust the angular position of the driven clutch drum at which it is braked, the control sleeve is rotated in the direction of rotation relative to the driven clutch drum so that the end portions of the spring engages the wall of the associated opening and continued rotation causes the spring to release from the driven clutch drum and the driven clutch drum to be placed in a new braked position.

BRIEF DESCRIPTION OF THE DRAWING

The invention will be more fully understood from the following detailed description thereof when considered in connection with the accompanying drawing wherein several embodiments of the invention are illustrated by way of example and in which.

DESCRIPTION OF THE PREFERRED EMBODIMENTS

Figure 1:
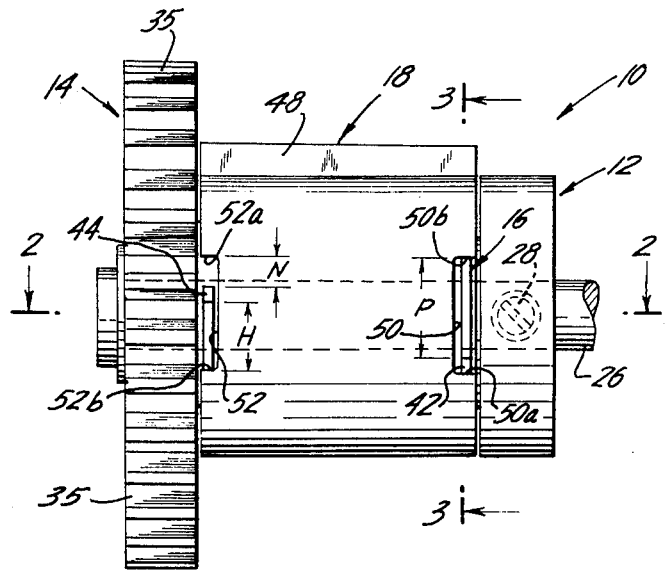
FIG. 1 is a view in elevation of a spring clutch assembly according to a first embodiment of this invention.

Now referring to the drawings and more specifically FIGS. 1 to 4, the reference number 10 generally designates a spring clutch assembly according to a first embodiment of this invention. While in the herein description the clutch drums will be identified as driving and driven clutch drums, it is to be understood that these designations, in accordance with this invention, are functionally interchangeable.

The spring clutch assembly 10 essentially comprises an input or driving clutch drum 12, an axially spaced output or driven clutch drum 14, a coaxially-arranged helical spring 16 surrounding the clutch drums 12 and 14, and a control collar or sleeve 18 coaxial of and surrounding spring 16.

The driving clutch drum 12 has a first reduced diameter portion 20 and a second further reduced diameter portion 22. An axial bore 24 is provided in driving clutch drum 12 to receive a drive shaft 26. Any suitable means, such as a set screw 28, may be employed to secure driving clutch drum 12 to drive shaft 26. The reduced diameter portion 20 provides a peripheral clutching surface 30 which is engageable by spring 16.

The driven clutch drum 14 has a cylindrical hub portion 32 which forms a peripheral clutching surface 34. An output member 35 such as a gear, pulley wheel or the like, forms either a part of driven clutch drum 14 or is connected to the driven clutch drum for conjoined rotation with the latter. An axial bore 36 is provided in driven clutch drum 14 to receive therein second reduced diameter portion 22 of driving clutch drum 12. To support driven clutch drum 14 for rotation on portion 22, a sleeve bearing 38 may be interposed between portion 22 and bore 36. The hub portion 32 is dimensioned so that the clutching surface 34 of driven clutch drum 14 lies in coplanar and close-spaced axial relationship with clutch surface 30 of driving clutch drum 12 so that a relatively narrow cross-over gap 40 is provided.

The spring 16 comprises a helically wound spring formed preferably from spring stock of polygonal configuration in cross-section. The opposite end portions of spring 16 have radially offset toes or tangs 42 and 44. The coils 46 of spring 16 are so dimensioned that their outer surfaces lie in close spaced relationship with the inner surface of control sleeve 18 and their inner surfaces are in interference fit with clutching surfaces 30 and 34. This interference fit between the spring 16 and clutching surfaces 30 and 34 effects transmission of torque between driving clutch drum 12 and driven clutch drum 14.

The control sleeve 18 has projecting from its outer surface a stop lug 48 or other suitable means for coacting with a stop element (not shown) such as a solenoid core, armature or the like, to selectively control rotation of control sleeve 18. Such control means for control sleeves are exemplified in the copending U.S. patent application, Ser. No. 483,130, filed June 26, 1974, and now U.S. Pat. No. 3,905,458; U.S. patents to Sajovec, U.S. Pat. No. 3,185,276; Wipke, U.S. Pat. No. 3,104,745; and Parker, U.S. Pat. No. 2,976,976. The control sleeve 18 also has, at its opposite ends, elongated openings or slots 50 and 52 which receive, respectively, tangs 42 and 44 of spring 16.

Figure 3:
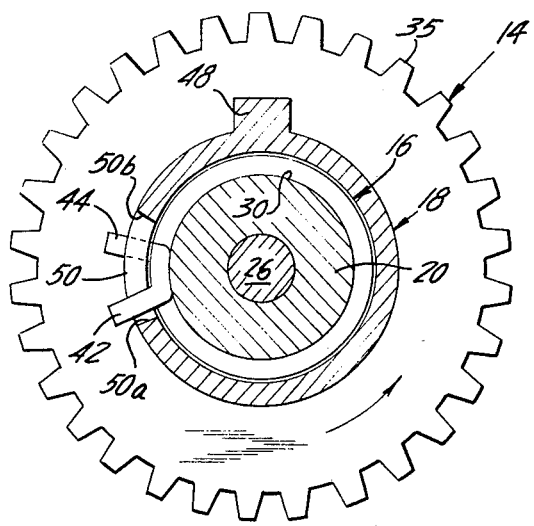
FIG. 3 is a transverse cross-sectional view taken along line 3—3 of FIG. 1.
Figure 2:
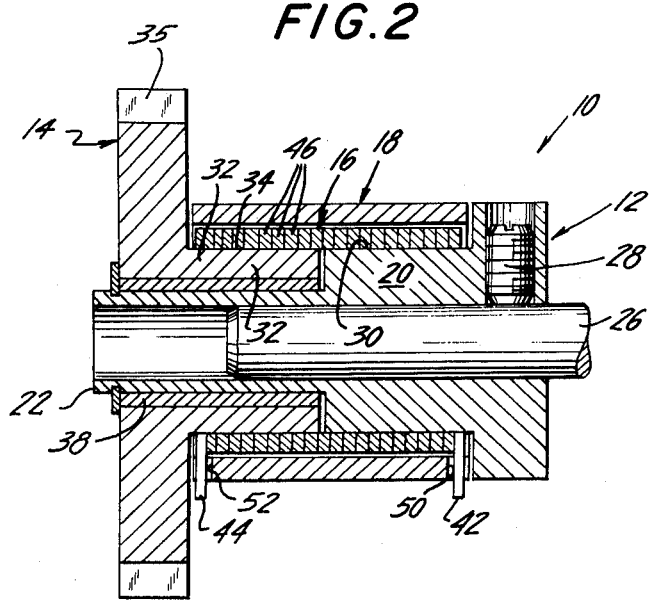
FIG. 2 is a longitudinal cross-sectional view taken along line 2—2 of FIG. 1.

In operation of the herein described spring clutch assembly 10, assuming for illustration purposes that the rotary power is supplied from a suitable source (not shown) through drive shaft 26 and assuming the rotation of the drive shaft to be in a counter-clockwise direction as viewed in FIG. 3, driving clutch drum 12 is rotated in a counter-clockwise direction. To provide for transmission of torque from driving clutch drum 12 to driven clutch drum 14, spring 16 must be right-hand-wound, as is shown in FIG. 3, so that the rotation of driving clutch drum 12 tends to further increase the magnitude of the interference fit of coils 46 on the clutching surfaces 30 and 34. Thus, spring 16 rotates with driving clutch drum 12 and thereby effects rotation of driven clutch drum 14 by reason of the grip of coils 46 of spring 16 on clutching surface 34 of the driven clutch drum. The rotation of driven clutch drum 12 causes rotation of output member 34, the latter, in turn, effecting rotation of other work producing elements (not shown) connected to output member 35. In this torque transmitting position, or clutch engaged condition, control sleeve 18 also rotates by reason of the abutment of tang 42 of spring 16 against the wall 50a of slot 50 in control sleeve 18 (see FIG. 2).

When it is desired to arrest or terminate transmission of torque, in other words, disengage clutch assembly 10, a stop element 40 (shown in phantom lines in FIG. 4) is actuated to contact stop lug 48 and thus stops rotation of control sleeve 18. With rotation of control sleeve 18 arrested, the coils 46 adjacent tang 42 and gripping clutching surface 30 are caused to unwind and release their engagement with clutching surface 30. Upon release of the grip of coils 46 on clutching surface 30, torque is no longer transmitted, via spring 16, to driving clutch drum 14 and the latter ceases rotation.

When control sleeve 18 is released and again allowed to rotate, the coils 46 of spring 16 are permitted under the stored energy (torsional loading) in the spring to contract and again grip clutching surface 30 of driving clutch drum 12.

Without structural modification, spring clutch assembly 10 can function to effect torque transmission from driven clutch drum 14 to driving clutch drum 12 instead of from driving clutch drum 12 to driven clutch drum 14 as hereinbefore described. With driven clutch drum 14 being the driven clutch drum, rotation is transmitted in a clockwise direction, as viewed in FIG. 3, through spring 16. When it is desired to disengage the spring clutch assembly, rotation of the control sleeve is arrested as previously explained. With control sleeve 18 held against rotation, driven clutch drum 14 (driving) carries spring tang 44 into abutment against wall 52a of slot 52 in control sleeve 18. This abutment of tang 44 causes spring coils 46 adjacent tang 44 to expand and thereby release their grip upon clutching surface 34 and effect cessation of torque transmission.

It is therefore believed clear that spring clutch assembly 10 provides for torque transmission through either clutch drum 12 or clutch drum 14 without structural modification of the spring clutch assembly together with disengagement being effected through arresting rotation of control sleeve 18.

Figure 4:
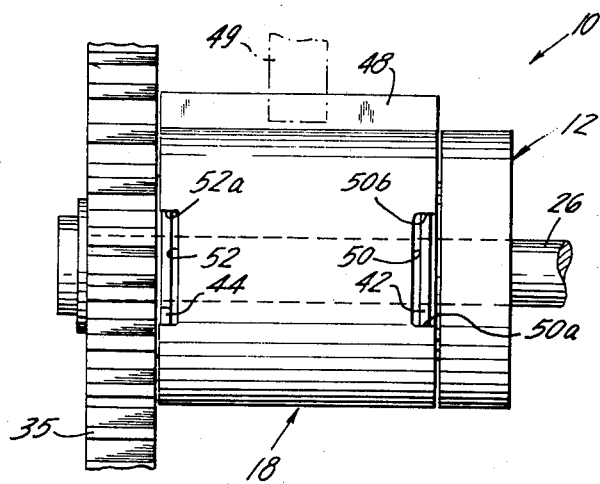
FIG. 4 is a view in elevation similar to FIG. 1 showing the spring and control sleeve when the spring clutch assembly is in the braked, operative position.
Figure 5:
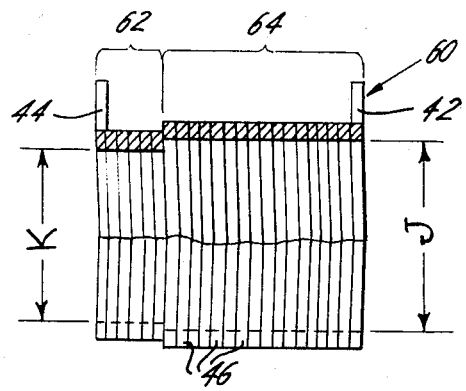
FIG. 5 is a view of a helical spring employed in a second embodiment of the present invention.

In a second embodiment of this invention, the spring clutch assembly is the same as described and shown in FIGS. 1 to 4 except that a spring 60 shown in FIG. 5 is substituted for spring 16. The spring 60 is similar to spring 16 except it has, as shown in FIG. 5, coil sections of different internal diameters. Because of the similarity of the spring clutch assembly of this embodiment utilizing spring 60 and spring clutch assembly 10, like parts will be designated by the same reference numbers in the description of this embodiment.

As shown in FIG. 5, spring 60 has two coil sections 62 and 64 in which coils 46 of section 62 are of smaller internal diameters K than the internal diameters J of coils 46 of section 64. When spring 60 is assembled on driving clutch drum 12 and driven clutch drum 14, the coil section 62 is in greater interference fit with clutching surface 34 of driven clutch drum 14 than coil section 64 on driving clutch drum 14. The number of coils 46 comprising coil section 62 is not critical so long as all of the coils of coil section 62 grip clutching surface 34.

In operation of a spring clutch assembly utilizing spring 60, if it is assumed that the spring is right-hand-wound, rotation of driving clutch drum 12 will be in a counter-clockwise direction as viewed in FIG. 3. Since coil sections 62 and 64 are gripping the respective clutching surfaces 30 and 34, rotation of driving clutch drum 12 is transmitted, via spring 60, to driven clutch drum 14. When disengagement is desired and rotation of control sleeve 18 is arrested, tang 42 abuts wall 50a of slot 50 in control sleeve 18 causing coils 46 of coil section 64 to expand clear of clutching surface 30, thus interrupting transmission of rotation. Due to the inertia of driven clutch drum 14 and output members connected thereto, driven clutch drum 14 continues to rotate and overruns driving clutch drum 12. This overrun of driven clutch drum 4 carries spring tang 44 in a counter-clockwise direction because of the continued interference fit of coil section 62 on clutching surface 34. As shown in FIG. 4, when overrun of driven clutch drum 14 is sufficient to cause angle H (see FIG. 1) between tang 44 and wall 52b of slot 52 to be reduced to 0° and tang 44 abuts wall 52b, such abutment thereby stops rotation of driven clutch drum 14.

In this embodiment, with the driving and driven clutch drums functionally reversed, and rotation is clockwise as viewed in FIG. 3, rotation is transmitted through spring 60 from driven clutch drum 14 to driving clutch drum 12. Disengagement of the spring clutch assembly by arresting rotation of control sleeve 18, as previously described for spring clutch assembly 10, is achieved by the continued rotation of driven clutch drum 14 which brings spring tang 44 into abutment against wall 52a of slot 52. This abutment of tang 44 against wall 52a causes the coils of coil section 62 to unwind or expand and cease its grip on clutching surface 34. The inertial overrun of driving clutch drum 12, upon disengagement, ceases when the driving clutch drum coasts to a stop; there is no braking function since tang 42 does not engage wall 50b of slot 50.

Figure 6:
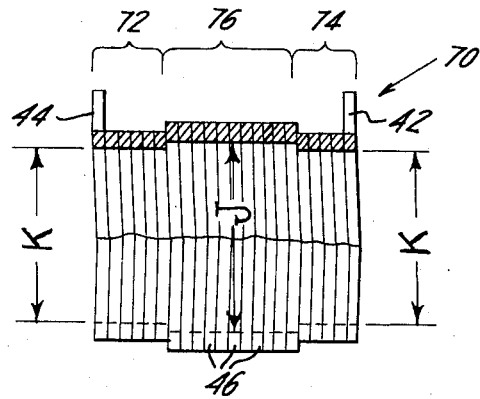
FIG. 6 is a view, similar to FIG. 5 showing a helical spring employed in a third embodiment of this invention.

In a third embodiment of this invention, the spring clutch assembly is the same as previously described with respect to the spring clutch assembly 10 shown in FIGS. 1 to 4, except that a spring 70, shown in FIG. 6, is substituted for spring 16. In view of the similarity of the spring clutch assembly utilizing spring 70 to spring clutch assembly 10, the same reference numbers will be used to designate like parts in the description of this embodiment.

The spring 70 is similar to spring 16 except that, as shown in FIG. 5, it has three coil sections 72, 74 and 76 having coils 46 of different internal diameters than the adjacent coil sections. The coil sections 72 and 74 adjacent the respective tange 44 and 42, have an internal diameter in the relaxed or non-assembled condition of a diameter K which is smaller than the internal diameter J of control coil section 76. When spring 70 is assembled to embrace driving and driven clutch drums 12 and 14, the coils 46 of coil sections 72 and 74 have a greater magnitude of interference fit on clutching surfaces 30 and 34 than coils 46 of coil section 76. The number of coils 46 of coil section 72 and 74 should not exceed ¾ of the total number of coils 46 in the entire spring 70 and, therefore, the number of coils of coil section 76 should be a minimum of ¼ of the total number of coils. The coil section 76 spans or bridges cross-over gap 40.

In operation of a spring clutch assembly having a spring 70, if it is assumed that the spring 70 is right-hand-wound, rotation of driving clutch drum 12 will be in a counter-clockwise direction, as viewed in FIG. 3, along with the rotation of spring 70, control sleeve 18 and driven clutch drum 14. When stop lug 48 is engaged to stop rotation of control sleeve 18, tang 42, as previously described, abuts wall 50a of slot 50 of control sleeve 18 so that, with the continued rotation of clutching surface 30 and the frictional contact of coils 46 thereon, coils 46 of coil section 74 expand or unwind to disengage clutching surface 30 and thereby effect cessation of torque transmission. The inertial coasting of driven clutch drum 14, upon disengagement, carries tang 44 into contact with wall 52b of slot 52 of control sleeve 18 and thus halts rotation of driven clutch drum 14.

In operation of the spring clutch assembly utilizing spring 70 where the driving and driven clutch drums are functionally reversed; that is, where the source of rotary power (not shown) initially drives driven clutch drum 14 in a clockwise direction as viewed in FIG. 3, rotation is transmitted via spring 70 to driving clutch drum 12. The disengagement of the spring clutch assembly, as previously explained with respect to the other embodiments, is achieved by arresting rotation of control sleeve 18 which causes tang 44 of spring 70 to abut wall 52a of slot 52 and thereby cause coils 46 of coil section 72 to expand and disengage from clutching surface 34. Again, similar to drive in the opposite direction, the inertial coasting of driving clutch drum 12 upon disengagement carries spring tang 42 of spring 70 into contact with wall 50b of slot 50 to thus halt coasting rotation of driving clutch drum 12. Thus, in this embodiment the output or driven drum from whichever end the spring clutch assembly is driven, is stopped after rotation through a relatively small angle.

In each of the herein described embodiments of this invention, wherein the spring clutch assembly has a spring 60 (FIG. 5) or a spring 70 (FIG. 6), the spring clutch assembly may be quickly and easily adjusted to effect the stopping of the output drum in a predetermined desired angular position. Thus, adjustment is accomplished by rotating the output clutch drum (driven clutch drum 14) and control sleeve relative to each other so as to bring tang 44 into abutment against wall 52a of slot 52. Thereafter, further relative rotation will place the output clutch drum in a new "stop" position. However, the lost motion or clearance P between tang 42 and wall 50b must be greater than the lost motion or clearance P between tang 44 and wall 52a of slot 52.

It is believed now readily apparent that the present invention provides a normally engaged, control sleeve type spring clutch assembly wherein the driving and driven clutch drums can be functionally interchanged to effect transmission of rotation with cessation of transmission effected through arresting rotation of the control sleeve and without any structural change. It is a spring clutch wherein the output or driven clutch drum is stopped in a predetermined desired angular position without the use of complex, coacting elements.

Although several embodiments of the invention have been illustrated and described in detail, it is to be expressly understood that the invention is not limited thereto. Various changes can be made in the arrangement of parts without departing from the spirit and scope of the invention as the same will now be understood by those skilled in the art.

I claim:
1. A normally engaged spring clutch comprising:
 a. a first clutch drum having a peripheral clutching surface;
 b. a second clutch drum having a peripheral clutching surface and spaced axially adjacent said first clutch drum;
 c. a helical spring surrounding said first and second clutch drums and having, at least, some of coils thereof dimensioned to be in interference fit with the clutching surfaces of said first and second drums to transmit torque from one of said drums to the other;
 d. a control sleeve surrounding said helical spring;
 e. control means for selectively permitting and arresting rotation of said control sleeve; and
 f. lost motion means interconnecting opposite end portions of the spring with the control sleeve so that, in engaged condition of operation, the control sleeve and spring rotate together and, in the disengaged condition of operation when rotation of the control sleeve is arrested, one end of the spring is held against rotation and caused to release its interference fit with a clutching surface of one of said first and second clutch drums.

2. The apparatus of claim 1 wherein said lost motion means comprises, at each end of the spring, a tang portion extending into an elongated opening in the control sleeve.

3. The apparatus of claim 1 wherein, in the torque transmitting condition of operation, a source of rotary power is connected to drive either the first and second clutch drums, and in a direction of rotation in relation to the winding of the spring, such as to increase the interference fit on the clutch drums driven by said source of rotary power.

4. The apparatus of claim 1 in which the spring has at least one set of coils, associated with a clutching surface of either said first or second clutch drums, of smaller size than the remaining coils.

5. The apparatus of claim 1 wherein the spring at opposite ends thereof and adjacent the clutching surface of said first clutch drum and adjacent the clutching surface of said second clutch drum have coils of smaller size than the coils therebetween.

6. The apparatus of claim 5 wherein the number of coils at each of the opposite ends of the spring does not exceed ⅜ of the total number of coils in the spring.

7. A normally engaged spring clutch comprising:
 a. a first clutch drum having an outer peripheral clutching surface;
 b. a second clutch drum having an outer peripheral surface and disposed coaxially, end-to-end, with said first clutch drum;
 c. a helical spring surrounding said first and second clutch drums and having, at least, some of its coils dimensioned to be in interference fit with the clutching surfaces of said first and second clutch drums to transmit torque from one of said first and second clutch drums to the other;
 d. a control sleeve coaxially with and surrounding said helical spring;
 e. control means for selectively permitting and arresting rotation of said control sleeve in either direction of rotation;
 f. said spring having a radially extending first tang portion at one end of the spring and a radially extending second tang portion at the opposite end of the spring; and
 g. a first elongated, arcuate opening in one end portion of the control sleeve and a second elongated, arcuate opening in the opposite end portion of the control sleeve to respectively receive therein, said first and second tang portions of the spring so that, in the engaged operative position, the first tang portion abuts a wall defining the first elongated opening in the control sleeve and thereby rotates the control sleeve with the spring and, in the disengaged operative position when the rotation of the control sleeve is arrested, the abutment of the first tang portion on said wall causes the coils adjacent said first tang to expand and release its interference fit on the clutching surface of the first clutch drum.

8. The apparatus of claim 7 wherein said spring has, at least, one coil of smaller internal diameter than the other coils so that the one coil has an interference fit with said clutching surface of said second clutch drum of greater magnitude than the other coils and thereby causes the adjacent second tang portion to be carried by the inertia of the second clutch drum, upon disengagement, into abutment with a wall of the second elongated opening in the control sleeve to stop such inertial rotation of the second clutch drum.

9. The apparatus of claim 7 wherein said spring has opposite end coil sections of smaller internal diameter than the coils therebetween so that the end coils more tightly grip the clutching surfaces of said first and second clutch drums than the intermediate coils.

10. The apparatus of claim 9 wherein the number of coils in each end coil section does not exceed more than ⅜ of the total number of coils in the spring.

* * * * *